United States Patent Office 3,371,068
Patented Feb. 27, 1968

3,371,068
POLYAMIDES FROM DIPIPERIDYLS
Jack Preston, Raleigh, and Ralph W. Smith, Durham, N.C., assignors, by mesne assignments, to Monsanto Company, a corporation of Delaware
No Drawing. Filed Mar. 9, 1962, Ser. No. 178,582
15 Claims. (Cl. 260—78)

This invention relates to synthetic linear condensation polyamides and more particularly to polyamides from the reaction of dipiperidyls with dicarboxylic acid chlorides and to their preparation.

In the prior art high temperature stable polyamides which are soluble in common polyamide solvents such as formic acid and phenols are for the most part virtually unknown. Polyamides of terephthaloyl chloride with various diamines are usually quite intractible. Polypiperazinium terephthalamide, for example, in infusible and insoluble in common polyamide solvents other than strong acids and phenolic solvents. Polyamides based on terephthaloyl chloride and aliphatic diamines are also quite intractible and are insoluble even in phenolic solvents. New high temperature stable polyamide compositions which could be dissolved in common polyamide solvents and processed by conventional wet or dry spinning techniques into filaments, fibers and films would be highly desirable.

It is the object of the invention to provide new and useful filament and fiber forming polyamides which are characterized by high melting points and ready solubility in simple volatile solvents and solvent mixtures.

A further object is the preparation of new polyamides derived form dipiperidyls and dicarboxylic acid chloride compounds.

An additional object of the invention is to provide a process for the preparation of the dipiperidyl polyamides of this invention.

Another object is to provide filaments, fibers and films from such polymers.

Other objects and advantages will be apparent from a consideration of the description of the invention which follows hereinafter.

In general, these and other objects of the invention are accomplished by providing a high molecular weight synthetic linear polyamide in which the polyamide chain contains the regularly recurring structural unit

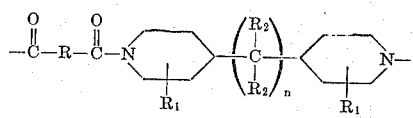

wherein R is a divalent hydrocarbon radical which may be a saturated aliphatic radical containing from 1 to 10 carbon atoms or an aromatic radical containing from 6 to 12 carbon atoms, $n$ is an integer of from 0 to 5, the methylene bridge connecting the piperidyl units is para or meta oriented, $R_1$ may be hydrogen, alkyl, arylene or halogen, and $R_2$ represents hydrogen or methyl. These polyamides are produced from the condensation polymerization reaction of dipiperidyl compounds of the general formula

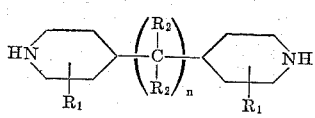

wherein $n$ is an integer of from 0 to 5, the methylene connecting bridge is para or meta oriented, $R_1$ may be hydrogen, alkyl, arylene and halogen, and $R_2$ may be hydrogen or methyl, with dicarboxylic acid chloride compounds of the general formula

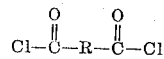

wherein R is a divalent hydrocarbon radical taken from the group consisting of saturated aliphatic radicals containing from 1 to 10 carbon atoms and aromatic radicals containing from 6 to 12 carbon atoms. When R is an aromatic radical it may contain non-polyamide forming substituents such as halogen, alkyl, alkoxy, nitro, sulfonyl and others so long as they do not interfere with the polymerization reaction.

Suitable dipiperidyl compounds coming within the above general formula include 1,2-di(4-piperidyl)ethane, 1,2-di(3,3' - dimethyl-4-piperidyl)ethane, di(4-piperidyl) methane, 1,2-di(3-piperidyl)ethane, 1,3-di(4-piperidyl) propane, 1,2-di(4-piperidyl)butane, 4,4'-bipiperidine, 3,3'-bipiperidine, 3,3'-dichloro-4,4'-bipiperidine, 1,3-bi(4-piperidyl) 2,2-dimethyl propane, 2,2-(4-piperidyl)propane, 2,3-dimethyl-2,3-di(4-piperidyl)butane and the like.

The dicarboxylic acid chlorides employed in the invention include aliphatic dicarboxylic acid chlorides such as succinyl chloride, suberyl chloride, adipyl chloride and the like. Dicarboxylic acid chlorides wherein the acid contains an odd number of carbon atoms such as malonyl chloride, glutaryl chloride, pimelyl chloride and azelayl chloride are less desirable because an odd number of carbon atoms in the acid leads to considerable reduction in the melting point of the polymer.

Further dicarboxylic acid chlorides include aromatic acid chlorides in which one or more hydrogens of the aromatic nucleus may be replaced by non-polyamide forming groups such as halogen, alkyl, alkoxy, nitro, sulfonyl and the like. When using terephthalic chlorides wherein the nucleus is substituted by a chloride or other radical the substitution should be di- or tetra- in order to maintain symmetry and insure proper orientation of filaments. When using isophthalic chlorides mono- or tri-substitution is preferred. Examples of such compounds are terephthaloyl chloride, isophthaloyl chloride, 5-chloro isophthaloyl chloride, tetrachloro terephthaloyl chloride, 2,5-dichloro terephthaloyl chloride, 5-methyl isophthaloyl chloride and similar compounds.

These polyamides are soluble in common volatile polyamide solvents. Polyamides from dipiperidyls wherein the acid component is aliphatic are soluble in chloroform, methylene chloride, 1,1,2-trichloroethane, methanol chloroform mixtures and the like. Where the acid component is aromatic acetic acid, formic acid, phenol, cyclohexanone, cyclic tetramethylene sulfone and the like are suitable plasticizers or solvents.

The polymers of this invention may be prepared by any suitable polymerization process such as interfacial polymerization, solution polymerization or melt polymerization processes all of which are conducted in the conventional manner. The polycondensation may be conducted in batch lots, by continuous methods or by semi-continuous methods. For purposes of illustration the discussion will be limited to a description of a suitable interfacial polymerization process it being understood, however, that any of the aforementioned polymerization processes may be utilized in this invention.

The interfacial polymerization process of this invention is carried out by providing an aqueous medium in which the dipiperidyl monomer is placed with a solvent, an emulsifying agent and an acid acceptor, the dicarboxylic acid chloride monomer is then added in an organic solvent and the process allowed to proceed to completion.

By the term "interfacial polymerization" is meant a method wherein the reactants are brought together in such a manner that the reaction zone is at or immediately adjacent to a liquid-liquid interface and most of the molecules of at least one of the intermediates must diffuse through a liquid diluent to arrive at the reaction zone.

The process for the preparation of these polyamides by interfacial polymerization involves mixing a water solution or suspension of the dipiperidyl compound with a water-immiscible dicarboxylic acid chloride until the desired condensation polymerization is completed. It is preferred that the addition of the one phase to the other be accompanied by sufficient rapid stirring to produce an emulsion of fine particle size. The process may be carried out over a considerable range of temperatures from just above the freezing point of the phase having the highest freezing point up to temperatures at which decomposition products form to an objectionable extent. It is preferred that the reaction be carried out in a temperature range of −10° to 60° C. The reactants are usually employed in substantially equimolar proportions although a slight excess of one or the other may be present.

It is advantageous to employ an emulsifying agent to assist in suspending one liquid phase in the other. To this end water or organic soluble emulsifying agents may be used. Examples of suitable emulsifying agents are anionic and nonionic compounds such as sodium lauryl sulfate, nonylphenoxy (ethyleneoxy) ethane, the sodium or potassium salt or any suitable condensed sulfonic acid and the like.

A proton acceptor is usually employed to absorb the hydrogen chloride which is liberated in the course of the reaction. A proton acceptor as the term is employed hereing indicates a compound which will maintain the pH range of the reaction mixture between 6 and 10 during the reaction. Suitable proton acceptors include sodium carbonate, magnesium carbonate, calcium carbonate, tertiary amines such as triethyl amine, trimethyl amine and tripropyl amine, or any other caustic alkali, alkaline carbonate, or other salt or strong base and a weak acid or tertiary organic base.

The dipiperidyl monomer is usually mixed with water in which it is dissolved or suspended by means of a suitable suspension media. Compounds which may be used as suspension mediums or dissolving media are tetrahydrofuran, chlorinated hydrocarbons, such as methylene chloride, chloroform and chlorobenzene, benzene, acetone, nitrobenzene, acetonitrile, toluene and the like.

The inherent viscosity of the polymers of this invention ranges from about 0.70 to 2.40 or higher indicating high molecular weight. Inherent viscosity measurements are obtained by the formula $$\text{inh.} = \frac{\ln \eta_{rel.}}{C}$$

in which C is the concentration of the polymer per 100 ml. of solution and ln $\eta_{rel.}$ is the natural logarithm of the viscosity of a dilute solution, 0.5 concentration, of the polymer in a solvent divided by the viscosity of the solvent alone in the same units and at the same temperature, 25° C.

The polymers of this invention are useful in a wide variety of shapes and forms. Fibers and filaments produced from some of the polymers by solution spinning techniques have excellent heat resistant characteristics which render them highly desirable for use in many commercial applications such as heat resistant filters, electric insulation, hoses, brake linings, protective clothing and curtains, filtration media, conveyor belts, parachutes, tires and various fire proof compositions. As films such polymers may be employed in a large variety of lining and coating end uses requiring prolonged resistance to high temperatures, acids, hydrolytic agents and other degradative conditions.

To further illustrate the present invention and the advantages thereof, the following specific examples are given, it being understood that these are merely intended to be illustrative. In the examples all parts and percents are by weight unless otherwise indicated.

Example I

A blending apparatus was prepared and charged with 200 ml. of water, 10 ml. of chloroform, 5.88 gm. (0.03 mole) of 1,2-di(4-piperidyl)ethane, 6.36 gm. (0.06 mole) of sodium carbonate, and 0.25 gm. of sodium lauryl sulfate. The chloroform acted to suspend the acid chloride and to act as a swelling agent to the polymer produced. With stirring 6.09 gm. (0.03 mole) of terephthaloyl chloride dissolved in 40 ml. of chloroform was added to the mixture. Two 5 ml. portions of chloroform were used to transfer quantitatively the acid chloride. The stirring was continued for 5 min. during which the temperature rose to 32° C. At this pointt he polymerization reaction was complete. The polymer was precipitated and washed, then dried in a vaccum oven at 60° C. The polymer was light, fluffy and somewhat resilient to the touch. The polymer produced did not melt below 320° C., but did darken and soften somewhat at 330° C. Viscous formic acid solutions of the polymer were prepared and fibers were formed by stringing out the solution in air and evaporating the solvent. These fibers were cold-drawable. The inherent viscosity of the polymer was 2.34 as measured from a solution of 0.5 gm. of the polymer in 100 ml. of m-cresol.

Example II

Into a suitable blending apparatus of one gallon capacity 2,000 ml. of water, 100 ml. of chloroform, 2.5 gm. of sodium lauryl sulfate, 6.36 gm. of sodium carbonate and 85.8 gm. of 1,2-di(4-piperidyl)ethane were added. This mixture was stirred and 60.9 gm. of terephthaloyl chloride dissolved in 400 ml. of chloroform was added gradually over a period of about 5 min. The temperature rose to 32° C. during the 5 min. period and then began to level off. At this point the polymerization reaction was complete. The polymer was isolated, washed and collected by filtration, dried in a vacuum oven. This example had an inherent viscosity of 1.78 and melted in a range of 346° to 354° C. A portion of this polymer sample was dissolved in 95 ml. of 95% formic acid then deaerated and wet spun into a water, caustic, coagulation bath. The resulting filament was hand drawn and produced fibers with a denier of 6.91, a tenacity of 2.75 gm. per denier and 16.1% elongation. These fiber properties were measured at 70° F. in air.

Example III

Into a blending apparatus was placed 200 ml. of water, 10 ml. chloroform, 0.25 gm. of sodium lauryl sulfonate, 6.36 gm. sodium carbonate, and 5.88 gm. 1,2-di(4-piperidyl)ethane. To this emulsion, while stirring was added 6.09 gm. of isophthaloyl chloride in 40 ml. of chloroform. The reaction was completed shortly and the polymer isolated, washed and dried. The inherent viscosity of this polymer was 1.64 measured in m-cresol and the melting point was 250° to 252° C.

Example IV

Into a blending apparatus was added 200 ml. of water, 10 ml. of chloroform, 0.25 gm. of sodium lauryl sulfate, 6.36 gm. sodium carbonate, 5.88 gm. of 1,2-di(4-piperidyl)ethane. To this emulsion, while stirring, was added 5.49 gm. of adipyl chloride suspended in chloroform. The mixture was stirred for 5 min., acidified with dilute HCl and about 300 ml. of ethanol was added. The resulting polymer was separated, isolated and prepared for further testing. The melting point of this polymer was 192° to 197° C. with inherent viscosity measured at a 0.5% concentration in m-cresol at 0.710.

Example V

To a blending apparatus was added 200 ml. of water, 10 ml. of chloroform, 0.25 gm. of sodium lauryl sulfate, 6.36 gm. sodium carbonate and 5.88 gm. of 1,2-di(4-piperidyl)ethane. To this rapidly stirred emulsion was added 6.13 gm. of 5-chloro-isophthaloyl chloride in 40 ml. of chloroform. The resulting polymer was isolated and dried. The polymer had a melting point of 254° to 255° C. and gave an inherent viscosity of 1.640 in m-cresol.

Example VI

To a blending apparatus was added 200 ml. of water, 10 ml. of chloroform, 0.25 gm. of sodium lauryl sulfate, 6.36 gm. sodium carbonate, and 5.88 gm. of 1,2-di(4-piperidyl)ethane. To this rapidly stirred emulsion was added 10.23 gm. of tetrachloro terephthaloyl chloride in 80 ml. of chloroform. The resulting polymer was precipitated, dried and gave a melting point of about 320° C. and an inherent viscosity of 0.621 in m-cresol.

Example VII

To a blending apparatus was added 200 ml. of water, 10 ml. chloroform, 0.2 gm. sodium lauryl sulfate, 6.36 gm. sodium carbonate and 5.04 gm. 4,4'-bipiperidine. To this rapidly stirred mixture was added 6.09 gm. of terephthaloyl chloride in 40 ml. of chloroform. The mixture was stirred for 10 min. and the resulting polymer was isolated, washed and dried. A sample of 0.2 gm. of this polymer dissolved in 1 ml. of formic acid gave a clear viscous solution from which fibers were spun and an opaque strong film was cast. The inherent viscosity of the polymer was 0.7 as measured in formic acid at 0.5% concentration. The polymer had a melting point in the range of from 376° to 380° C. Differential thermal analysis data showed decomposition at 475° C. and thermogravimetric analysis showed less than 5% weight loss at 475° C. and 3% at 425° C.

These examples clearly show the high degree of heat stability achieved by the polymers of this invention as well as their ease of dissolving in common polyamide solvents and good spinning properties. The high temperature stability of the polymers of this invention is more noticeable and is satisfactorily tailored for specific end uses where the dipiperidyl monomers are employed in connection with various aromatic acid chlorides rather than aliphatic acid chlorides.

It will be understood to those skilled in the art that many apparently widely different embodiments of this invention can be made without departing from the spirit and scope thereof. Accordingly, it is to be understood that this invention is not to be limited to the specific embodiments thereof except as defined in the appended claims.

We claim:

1. Synthetic linear heat resistant polyamides consisting of the regularly recurring structural unit

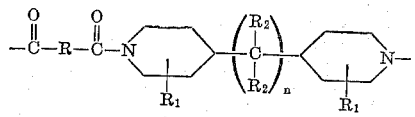

wherein R is a divalent hydrocarbon radical taken from the group consisting of saturated aliphatic radicals containing from 1 to 10 carbon atoms and aromatic radicals containing from 6 to 12 carbon atoms, $n$ is an integer of from 0 to 5, $R_1$ is taken from the group consisting of hydrogen, alkyl, arylene and halogen and $R_2$ is taken from the group consisting of hydrogen and methyl.

2. The polyamide produced by the reaction of 1,2-di(4-piperidyl)ethane and terephthaloyl chloride.

3. The polyamide produced by the reaction of 1,2-di(4-piperidyl)ethane and isophthaloyl chloride.

4. The polyamide produced by the reaction of 1,2-di(4-piperidyl)ethane and adipyl chloride.

5. The polyamide produced by the reaction of 4,4'-bipiperidine and terephthaloyl chloride.

6. The polyamide produced by the reaction of 4,4'-bipiperidine and isophthaloyl chloride.

7. A process for preparing a polyamide which comprises bringing together in an aqueous polymerization system a dipiperidyl compound of the general formula

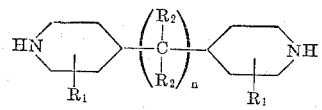

wherein $n$ is an integer of from 0 to 5, $R_1$ is taken from the group consisting of hydrogen, alkyl, arylene and halogen and $R_2$ is taken from the group consisting of hydrogen and methyl, a polyamide solvent, an emulsifying agent, an acid acceptor and a dicarboxylic acid chloride of the general formula

wherein R represents a divalent hydrocarbon radical taken from the group consisting of saturated aliphatic radicals containing from 1 to 10 carbon atoms and aromatic radicals containing from 6 to 12 carbon atoms, and maintaining the system in admixture until the polymerization reaction has taken place with the formation of a synthetic linear orientable fiber forming polyamide.

8. The process of claim 7 wherein the dipiperidyl is 1,2-di(4-piperidyl)ethane.

9. The process of claim 7 wherein the dipiperidyl is 4,4'-bipiperidine.

10. The process of claim 7 wherein the dicarboxylic acid chloride is terephthaloyl chloride.

11. The process of claim 7 wherein the dicarboxylic acid chloride is isophthaloyl chloride.

12. The process of claim 7 wherein the dicarboxylic acid chloride is adipyl chloride.

13. The process of claim 7 wherein the emulsifying agent is sodium lauryl sulfate.

14. The process of claim 7 wherein the acid acceptor is sodium carbonate.

15. Fibers comprised of the polymers of claim 1.

References Cited

UNITED STATES PATENTS 3,150,146  9/1964  Fields _____ 260—78
3,197,442  7/1965  Kramer et al. _____ 260—78

WILLIAM H. SHORT, *Primary Examiner.*

LOUISE P. QUAST, *Examiner.*

H. D. ANDERSON, *Assistant Examiner.*

UNITED STATES PATENT OFFICE
CERTIFICATE OF CORRECTION

Patent No. 3,371,068　　　　　　　　　　　　February 27, 1968

Jack Preston et al.

It is certified that error appears in the above identified patent and that said Letters Patent are hereby corrected as shown below:

Column 4, line 36, for "85.8 gm. of 1,2-di(4-piperidyl)ethane" read -- 58.8 gm. of 1,2-di(4-piperidyl)ethane --.

Signed and sealed this 24th day of June 1969.

(SEAL)
Attest:

Edward M. Fletcher, Jr.　　　　　　　　WILLIAM E. SCHUYLER, JR.
Attesting Officer　　　　　　　　　　　　Commissioner of Patents